J. J. CONVERY.
TIRE MAKING MACHINE.
APPLICATION FILED JULY 6, 1918.
1,332,108.
Patented Feb. 24, 1920.
11 SHEETS—SHEET 9.
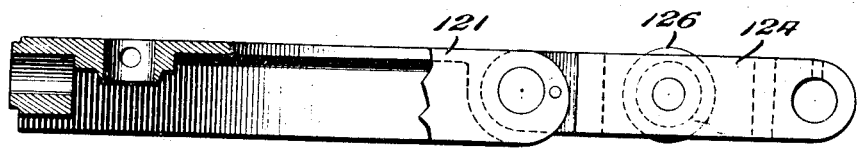
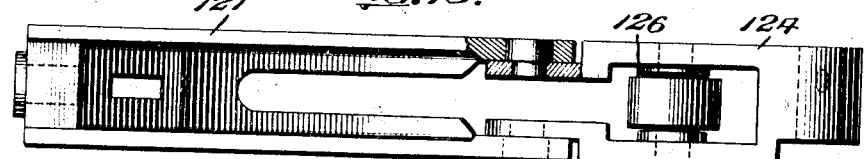
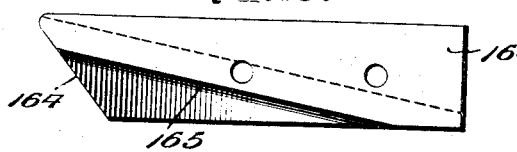
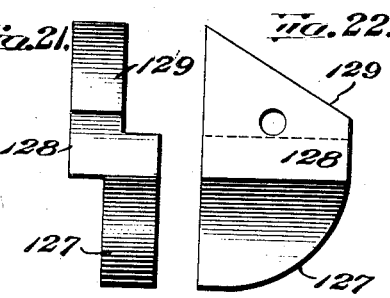
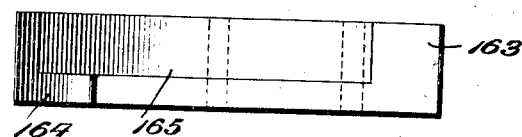
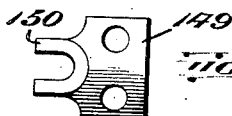
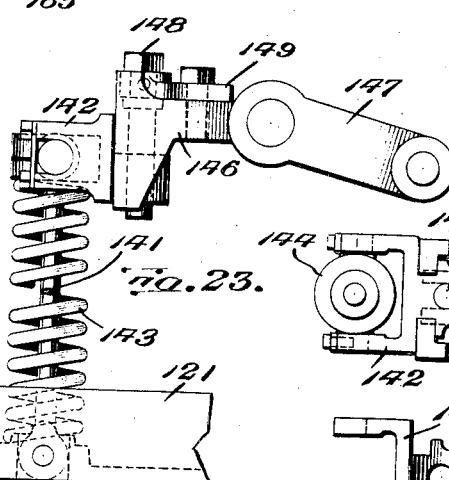
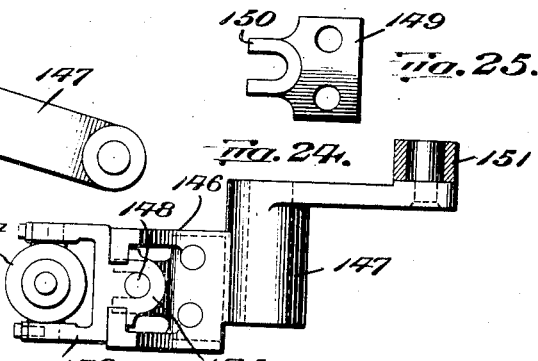
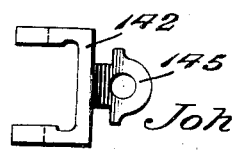
Inventor
John J. Convery
By Edmund H. Barnes
Attorney
Witnesses
Philip E. Barnes

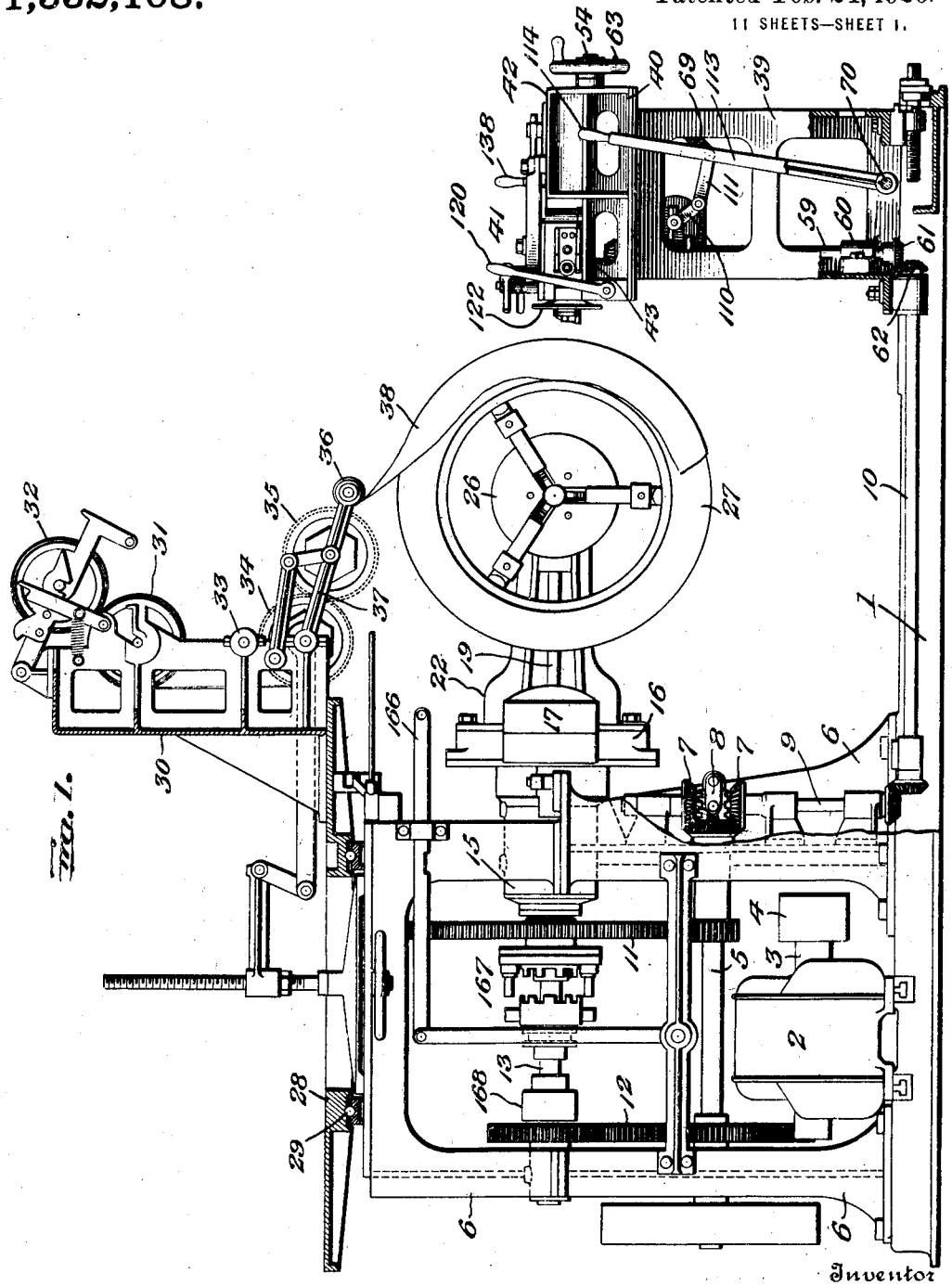

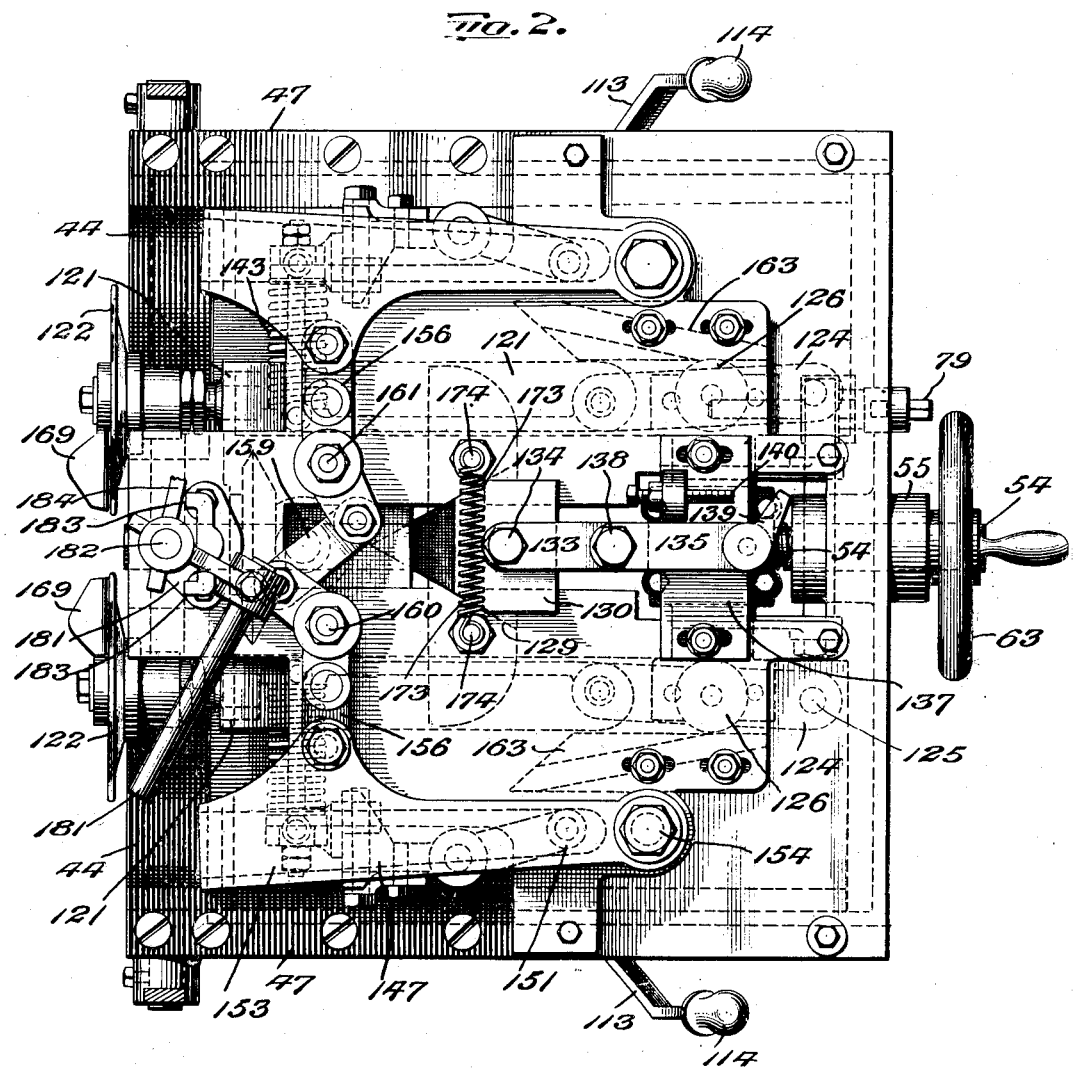

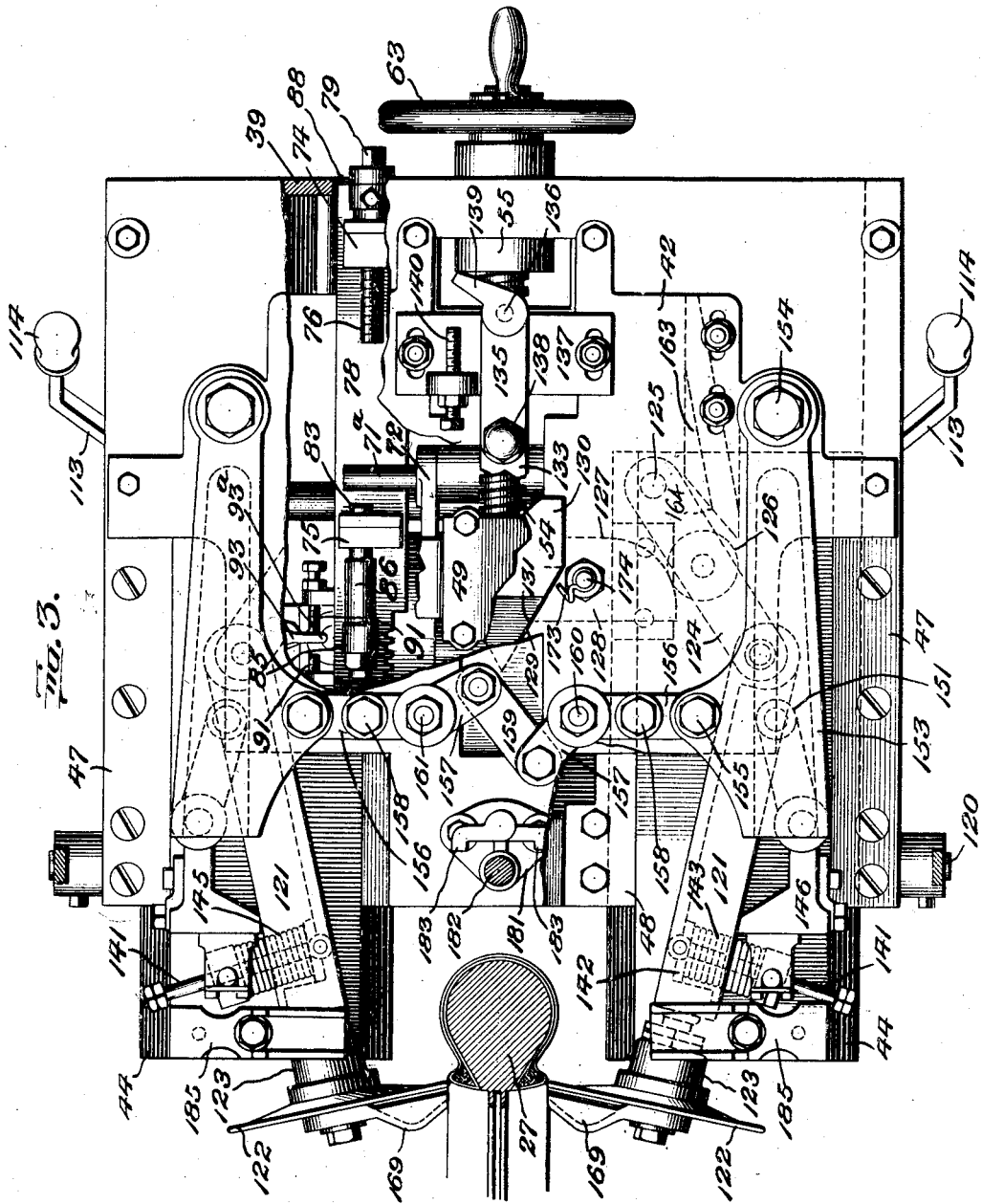

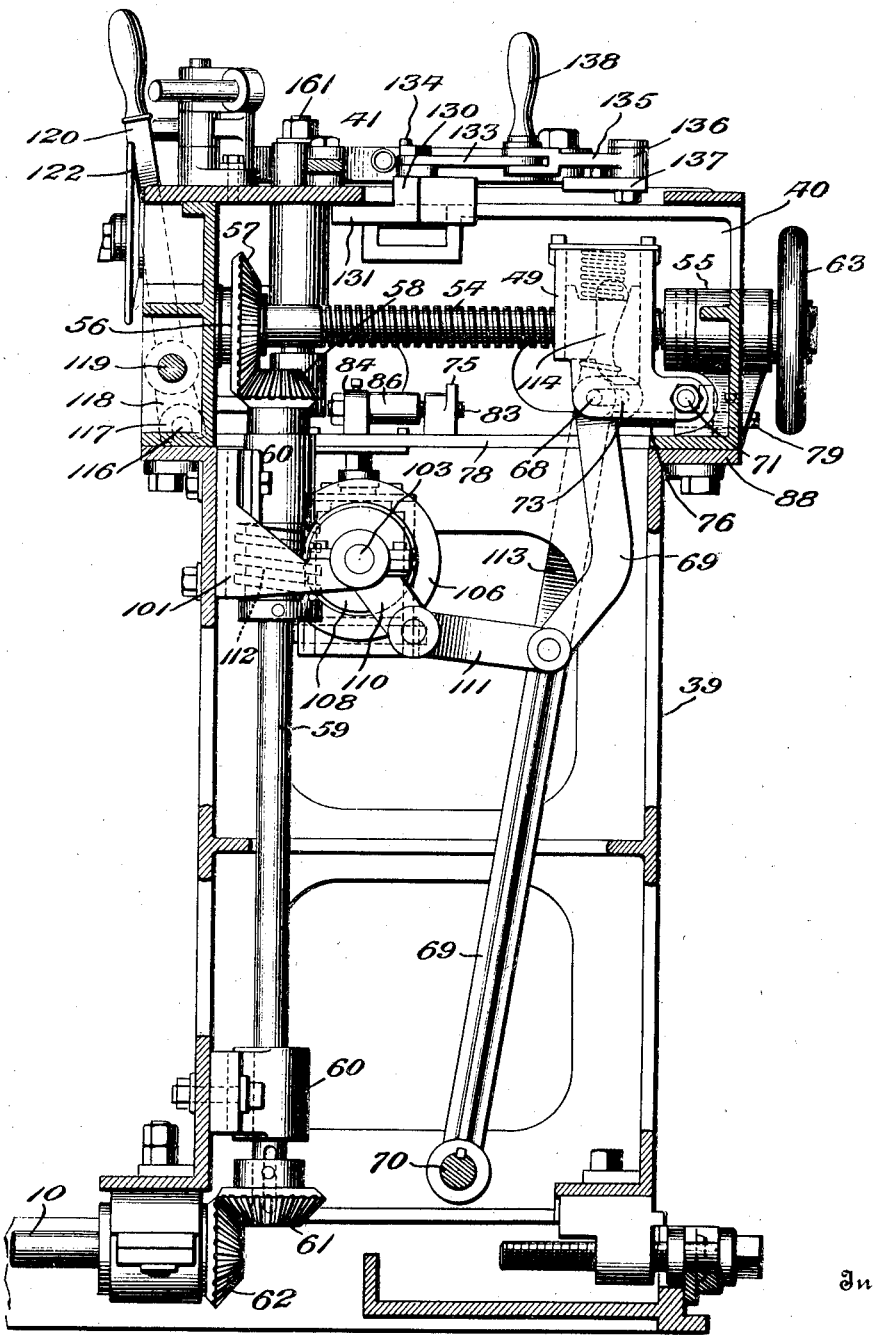

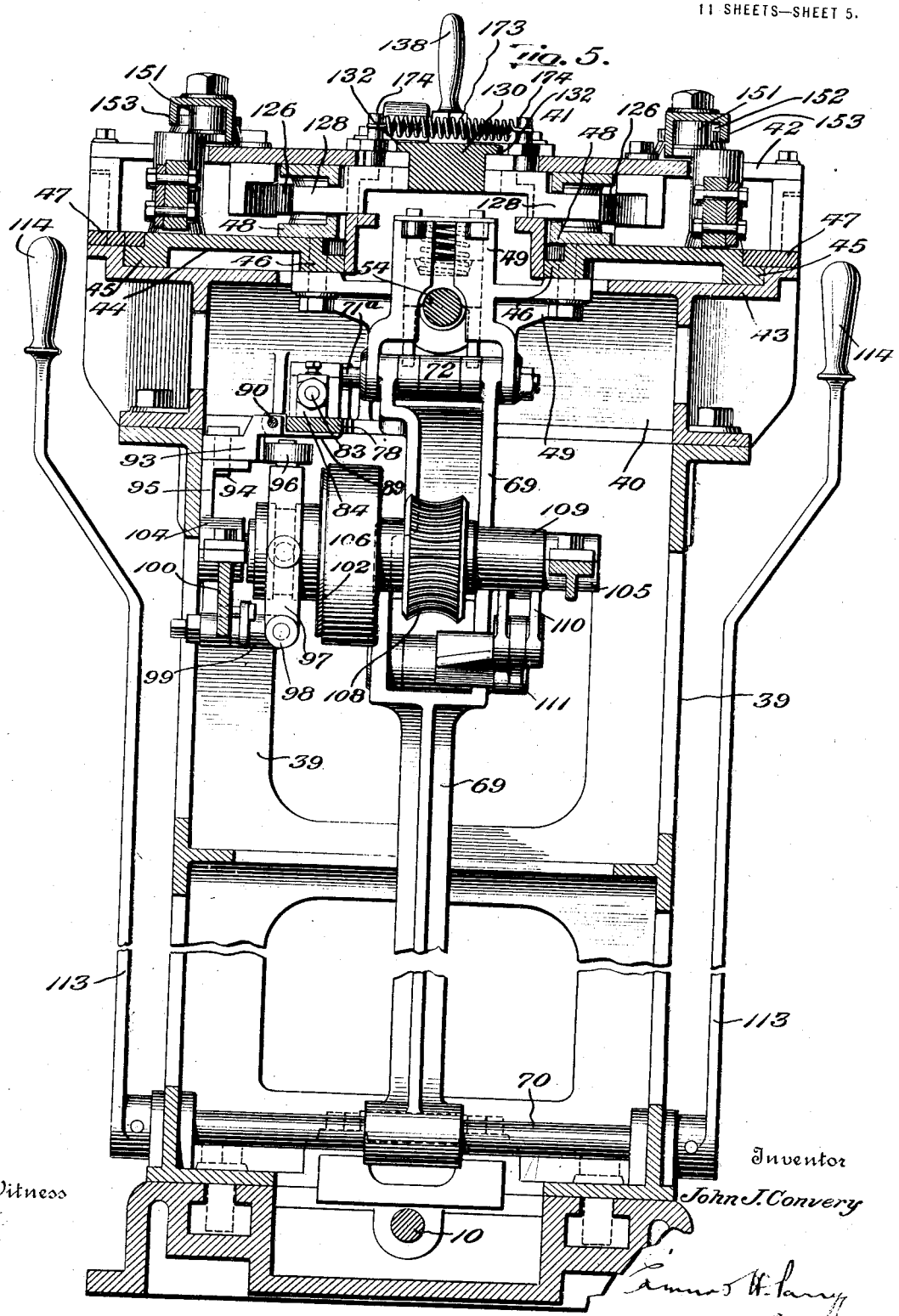

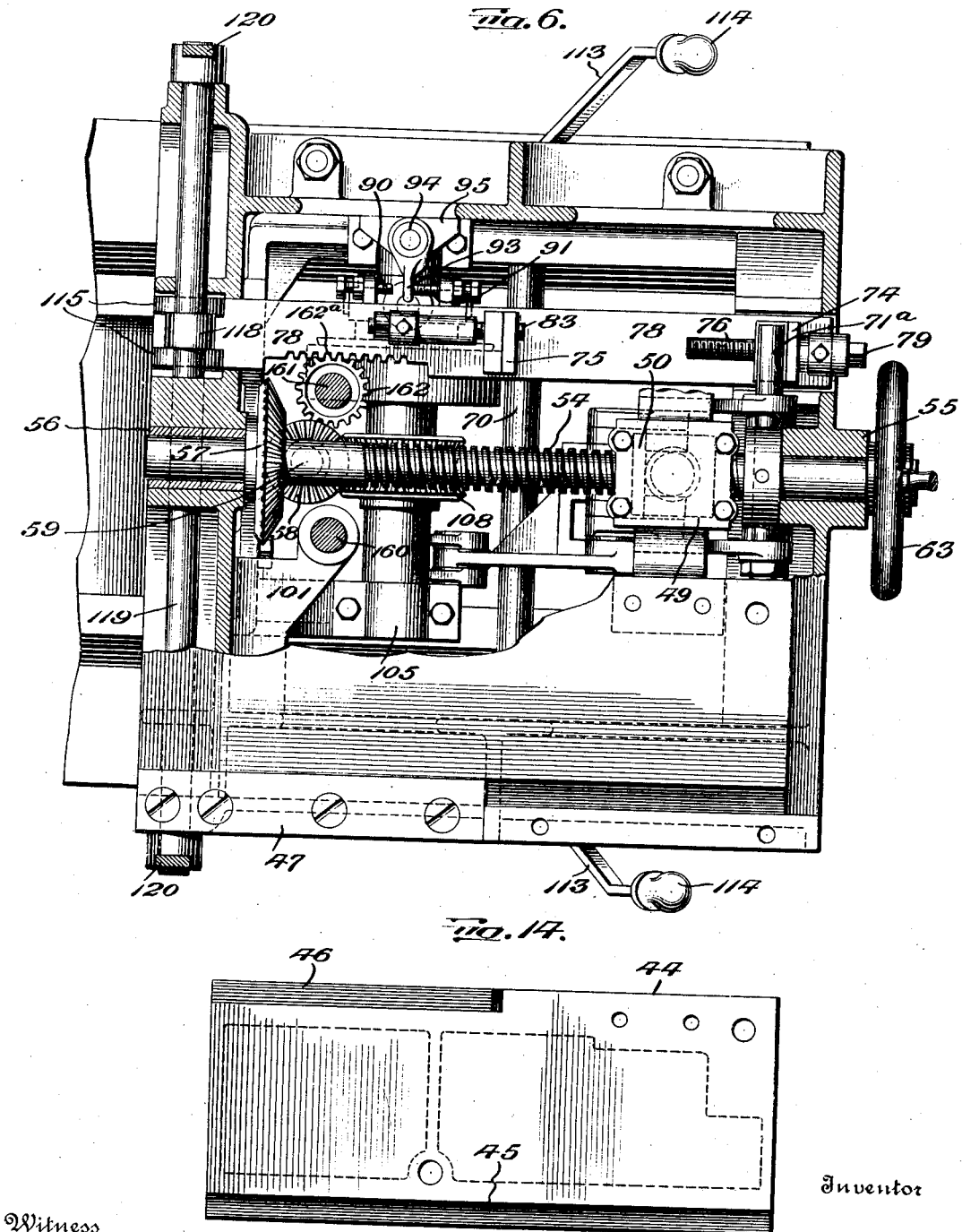

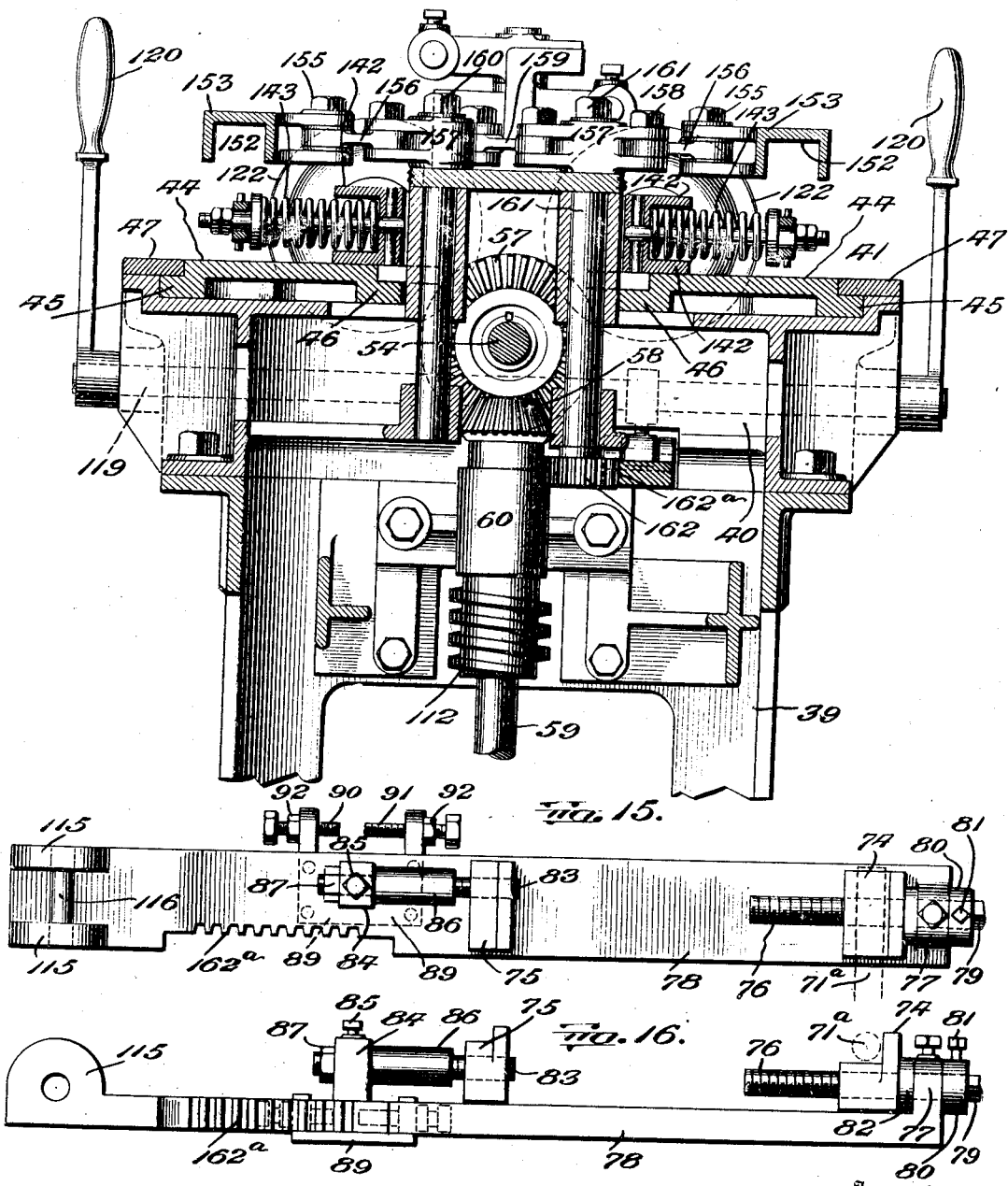

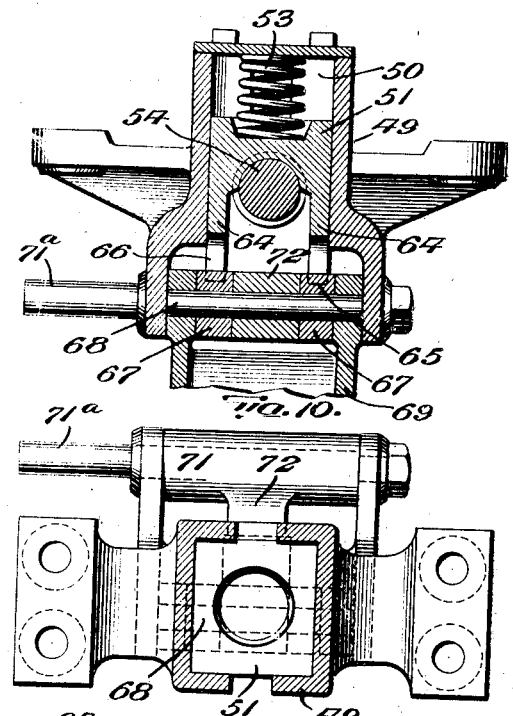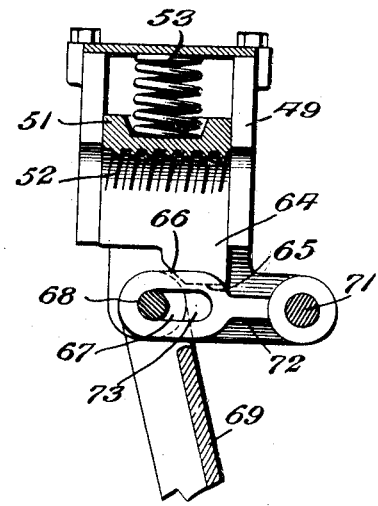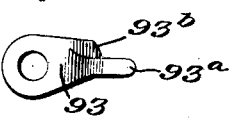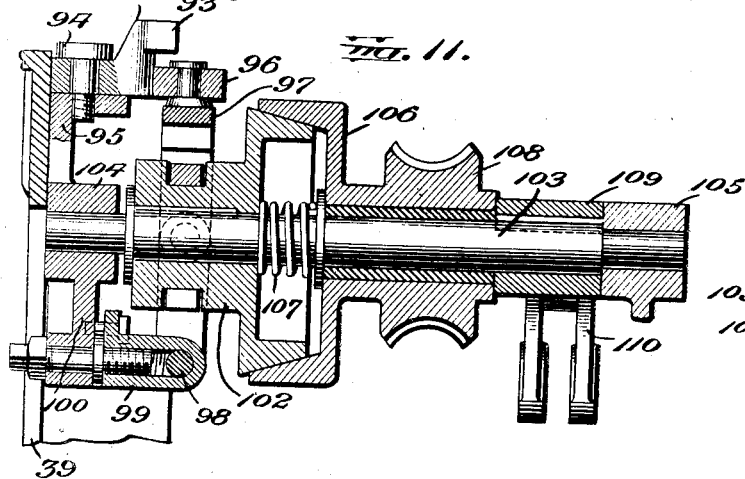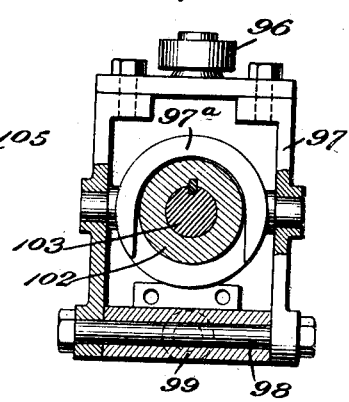

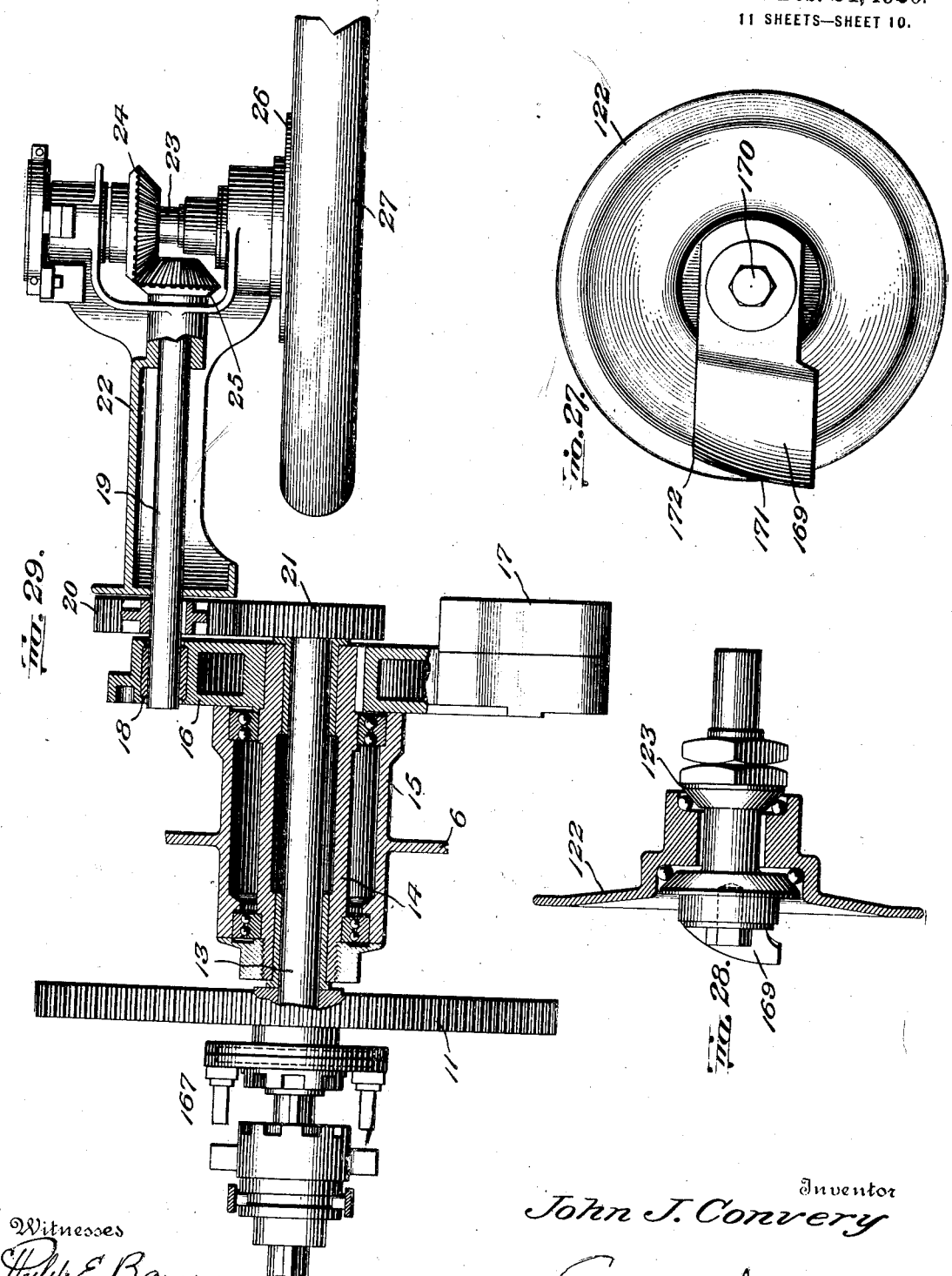

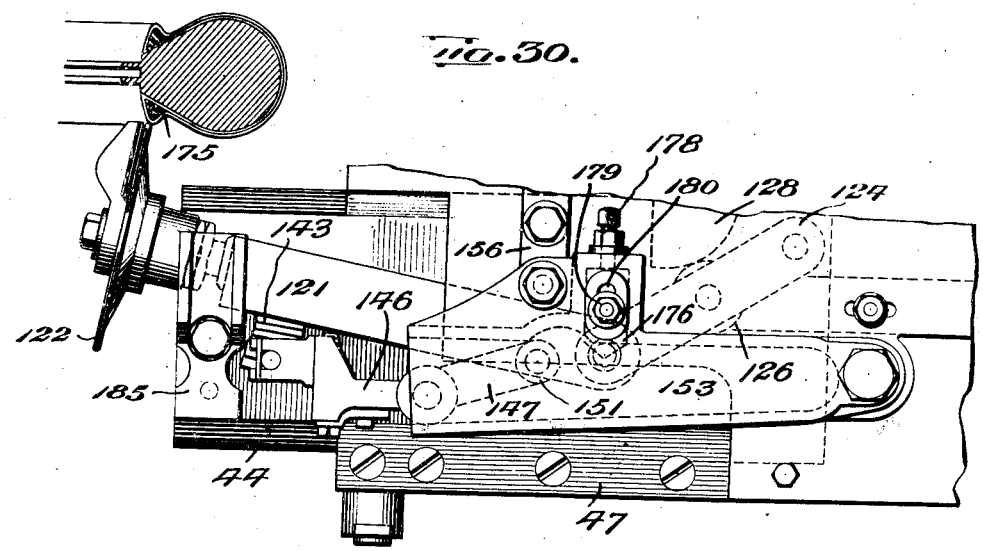
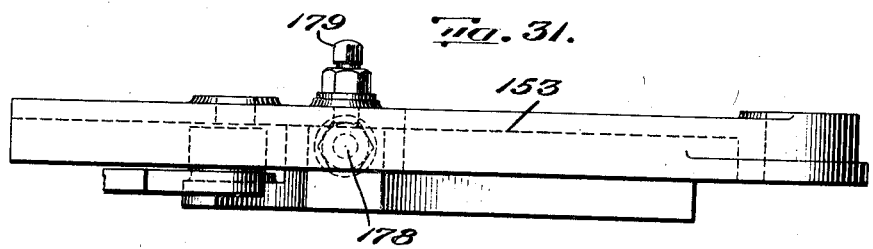
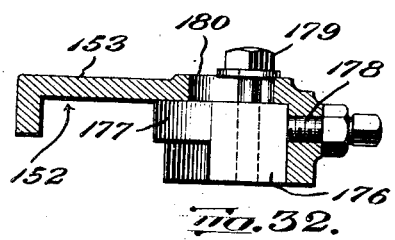
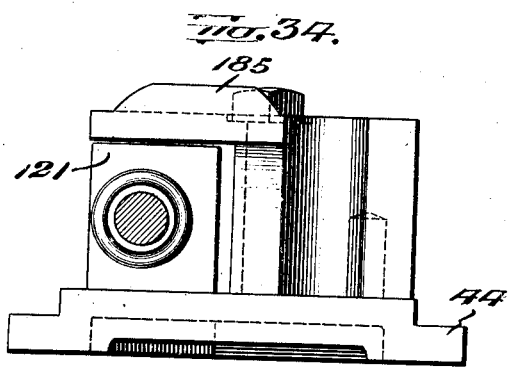
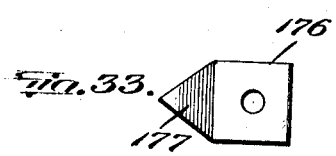

UNITED STATES PATENT OFFICE.

JOHN J. CONVERY, OF NEW YORK, N. Y., ASSIGNOR TO KELLY-SPRINGFIELD TIRE COMPANY, OF AKRON, OHIO, A CORPORATION OF NEW JERSEY.

TIRE-MAKING MACHINE.

1,332,108.　　　　　Specification of Letters Patent.　　Patented Feb. 24, 1920.

Application filed July 6, 1918. Serial No. 243,585.

*To all whom it may concern:*

Be it known that I, JOHN J. CONVERY, a citizen of the United States, residing at New York, in the county of New York and State of New York, have invented certain new and useful Improvements in Tire-Making Machines, of which the following is a specification, reference being had therein to the accompanying drawing.

This invention relates to tire-making machines and has especial reference to structures for building the so-called "carcass" of a pneumatic tire or casing.

The machine comprises, generally, three units; namely, a stock-supplying unit, a tire-core unit, and a stitcher-mechanism unit. These three units are so aggrouped and correlated that, as tire-fabric is delivered onto the core-unit from the stock-supplying unit, such fabric will be given an initial, predetermined stretch along its medial line and, thus, be in proper condition to be operated upon by the stitcher-mechanism, the function of which is then to "stitch" the fabric down upon the core unit to construct the carcass. These units are juxtaposed, one to the other, so that the entire machine may be conveniently and expeditiously handled by a single operator, if desired.

The object of the invention is to provide a structure which is simple in construction, and yet is capable of rapid and efficient operation with a minimum of manual labor, and whereby successive layers or plies of tire-fabric may be properly positioned upon and shaped about the tire-core without wrinkles or creases and with resulting production of a high-grade and uniform product.

Another object of the invention, and one of first importance, is to provide, in conjunction with the afore-mentioned stitcher-mechanism, a structure which will cause such mechanism to operate at all times with certainty and also with a predetermined movement in respect to the core, whereby the fabric may be evenly laid thereon and without causing wrinkling or creasing thereof and, especially, the portions which are superposed upon the beads during the "over-bead" operation.

A still further object of the invention is to provide, as a part of the stitcher-mechanism, fabric-stitching rolls or disks so disposed and operated as to function efficiently to stitch the tire-fabric about the core with a uniformity of radial stretch of the fabric, whereby the same will be laid upon the core, or upon an underlying ply of fabric on the core, smoothly and without wrinkles or creases.

Still another object within the contemplation of the invention is to provide a structure in which the speed of operation of the machine is timed in proportion to its highest capacity, whereby a uniform and satisfactory "carcass," of superior character, may be produced and much more quickly than is possible in the so-called hand-operation of building tire-carcasses.

Other objects and advantages of the invention will at once be apparent from the annexed drawings; but these will be more particularly elaborated upon in the following description.

My invention resides, generically, in the structural features, in the combination of elements constituting the same, and in the arrangement of the parts thereof, all as will be more fully hereinafter set forth.

In the accompanying drawings, forming a part of this specification, I have (by way of example) illustrated one of the many feasible embodiments of the invention. It is, however, to be observed that the particular embodiment and utilization (employing the underlying features of my invention) herein disclosed are merely illustrative and may be varied to a wide extent without departing from the spirit of the invention and without sacrificing any of the advantages and importance of the same.

In these drawings:

Figure 1 is a view in elevation of the machine showing, in section, the aforementioned stock-supplying unit, the core unit, and the stitcher-mechanism unit;

Fig. 2 is a view in top plan of the stitcher-mechanism as mounted upon a carriage which has a reciprocatory movement in relation to the tire-core;

Fig. 3 is also a view in top plan, somewhat similar to Fig. 2, but with parts broken away to show the position which certain devices assume when acting upon a tire-core;

Fig. 4 is a view in vertical, longitudinal section of the stitcher-mechanism, and showing particularly the carriage-advancing and returning mechanism therefor;

Fig. 5 is a view in vertical, transverse section of the same;

Fig. 6 is a view, mostly in longitudinal, horizontal section thereof;

Fig. 7 is a fragmentary view, in vertical transverse section, of the stitcher-mechanism and of the carriage upon which it is supported for its reciprocatory movement in respect to the tire-core;

Figs. 8, 9, 10, 11, 12 and 13 are views, respectively, in sectional elevation and horizontal and transverse section of the carriage and parts of the carriage-arresting and returning mechanisms;

Fig. 14 is a detached view in plan of one of the slides which forms a part of the carriage and facilitates its travel in its reciprocatory movement;

Figs. 15 and 16 are views in plan and elevation of certain controlling devices by which the movement of the stitcher-carriage is governed;

Figs. 17 and 18 are views in elevation and bottom plan (and partly in section) of the stitcher-roll-supporting arm;

Figs. 19 and 20 are views in plan and elevation of an arm-guiding member;

Figs. 21 and 22 are views, in elevation and plan, of an arm-swinging device;

Fig. 23 is a view in plan of one of the spring-actuated arm-operating devices for producing pressure on the stitcher-supporting arm;

Figs. 24, 25 and 26 are details thereof;

Fig. 27 is a view in elevation of one of the stitcher-rolls, with which is operatively associated a fabric-guide;

Fig. 28 is a view in section thereof;

Fig. 29 is a fragmentary view in sectional elevation of the core-unit, of its support, and of its driving-mechanism;

Fig. 30 is a fragmentary view in plan of a modified form of stitcher-mechanism;

Fig. 31 is a view in elevation thereof; and

Figs. 32, 33 and 34 are detail views of parts of such mechanism.

Referring to these drawings, it will be noted that, as shown particularly in Fig. 1, the machine in its entirety, is mounted (by preference) upon a base 1, and on this are supported the three units aforementioned, namely, the core unit, the stock-supplying unit, and the stitcher-mechanism unit.

Mounted on this base is a prime-mover for driving the mechanism of the machine and, in this instance, this driver is shown as an electric motor 2. The armature-shaft 3 of this motor carries a pulley 4 adapted to drive a belt (not shown) which, in turn, drives a constantly rotating shaft 5 suitably journaled in a frame 6 upstanding from the base 1. This frame constitutes a support for the several parts of the stock-supplying unit and of the core-unit. The shaft 5 is adapted to be connected, as by gearing 7 and a clutch 8, to a vertical shaft 9 which, in turn, drives a main-stitcher-operating shaft 10.

*Core-unit.*—Referring, now, particularly, to Figs. 1 and 29, it will be understood that the shaft 5 is, through a train of low-speed gearing 11 and high-speed gearing 12, connected to a main core-drive 13 which is journaled in a bearing 14 and this is, itself, journaled in and encompassed by a bearing 15 formed in the upstanding frame 6. Secured to the bearing 14 is a rototable support 16 carrying a counterweight 17 at one portion and, at the opposite portion, a bearing 18 in which rotates a shaft 19 adapted to be driven by a pinion 20 fast thereon and which meshes with a gear 21 fast on the shaft 13. Supported on the shaft 19 is a bearing-bracket 22 in which is journaled a stub-shaft 23 carrying a beveled pinion 24 which meshes with a corresponding pinion 25 on the end of the shaft 19. Secured to the shaft 23 is a core-chuck 26 upon which a core 27 is removably mounted. The purpose of mounting the bearing 14 within the bearing 15 is to permit rotation of the specified parts connected to the bearing 15 so that the core-chuck and core may be rotated (on an axis formed by the bearing 14) from the vertical position shown in Figs. 21 and 29, either to a horizontal position—wherein it may, for some purposes, be more conveniently manipulated upon, as, for example, after the fabric has been stretched thereon to permit the finishing of the carcass—or to a reversed vertical position wherein it will be rotated in the opposite direction without change in the direction of movement of its drive, and this for a purpose hereinafter to be explained.

I may if desired, and in some instances preferably do dispense with this rotating core-support and, instead, secure the pinion 25 directly to the shaft 13 and support the bracket 22 (or its equivalent) in an upright upstanding from the base 1 and at one side of the frame 6, as disclosed in my co-pending application, Serial No. 239,827.

It will be understood that the core 27 is first driven at slow speed through the connecting gear 11 interposed between the shaft 5 and the shaft 13, and this is done while the fabric is being initially stretched upon the core. Then, during the stitching operation, this slow-speed gear is disconnected from the shaft 13 and the latter is connected to the shaft 5 through the interposed high-speed gear 12.

*Stock-supplying unit.*—This comprises a rotatable, vertically-disposed structure which consists of a plurality of rolls, etc.; but as it is to constitute the subject-matter of a separate application, I shall not herein describe the same in great detail. Suffice it to say that, as seen in Fig. 1, this unit comprises, for example, a table 28 rotating on bearings 29 carried by the frame 6. Upstanding from this table is a series of roll-sustaining brackets 30, and on each of these is mounted a fabric-roll 31, a juxtaposed liner-roll 32, an idler-roll 33, fabric-tensioning rolls 34 and 35, and an outstanding idler-roll 36. The rolls 34 and 35 are carried by a pair of arms 37 pivoted on the bracket 30. By reason of the fact that the rolls 34 and 35 are connected by gears (not shown) of the same diameter, and because of the further fact that these rolls, themselves, are of different diameters, the fabric 38, as it is drawn from the supply-roll 31 around the rolls 34 and 35, is stretched to a predetermined degree along its medial line, all as explained in the aforementioned separate application.

*Stitcher-mechanism unit.*— This preferably comprises a frame 39 upstanding from the base 1. In the upper portion of this frame is a housing 40 for certain mechanism presently to be described and also for supporting a stitcher carriage marked, generally, 41 which is adapted to be reciprocated in respect to the core 27. The housing 40 is formed with a top 42, and with an intermediate surface 43 on which the carriage 41 slides to and fro in respect to the core.

The carriage 41 comprises spaced-apart slides or plates 44; there being two of these for the carriage, and each is offset at opposite sides to provide longitudinal flanges 45 and 46. Bolted to the top of the housing 40 and adapted to engage the flange 45 of the respective slides is a guide-strip 47. The flange 46 is likewise engaged by a guide 48 bolted to the top of the housing. Secured to the slides 44 and adapted to connect them together is a cross-tie member 49. As shown in Figs. 8, 9 and 10, this tie-member 49 is formed with an upstanding housing to provide a substantially square space 50 in which a block or half-nut 51 has an up-and-down movement. This half-nut is provided with an internal thread 52, for a purpose presently to be explained. The nut is operated by a compression spring 53 in respect to a carriage feed-screw 54 which extends longitudinally of the housing 40 and is mounted in bearings 55 and 56 (Figs. 5 and 6) in this housing.

The feed-screw 54 is normally adapted to be constantly rotating, and motion is imparted to it by the following means: Fast on the screw is a pinion 57 adapted to mesh with a pinion 58 fast on a vertical shaft 59 mounted in journals 60 in the frame 39 and carrying at its lower end a pinion 61 which meshes with a pinion 62 fast on the shaft on the main stitcher-operating shaft 10. By these means, the screw 54 is operated by power produced from the motor 2. At times, however, it may be desirable to rotate the feed-screw 54 manually and to this end it carries a hand-wheel 63 at its outer end.

The nut 51 is the active instrumentality for operatively connecting the carriage to the feed-screw 54 to set the carriage into motion. Means are provided, and preferably actuated at the will of the operator, to engage the nut with the feed-screw, and such means includes the following mechanism: The nut 51 is formed with two pendant portions 64, and each of these in turn is provided with an approximately horizontal surface 65 and an inclined surface 66 (Fig. 9). These surfaces 65 and 66 are adapted alternately to engage rollers 67 mounted on a cross-pin 68 carried by the upper end of a nut-positioning and carriage-returning lever 69 which has its lower end supported on a shaft 70, journaled in the lower portion of the upright frame 39. As best seen in Fig. 8, the upper portion of the lever 69 is bifurcated and the rollers 67 are disposed between the bifurcations thereof. Interposed between the rollers 67 and pivoted on a short shaft 71 (mounted in a rearwardly-extending section of the tie-member 49) is a link 72 provided at its free end with an elongated slot 73, for a purpose presently to be described.

The foregoing constitutes the mechanism, generally for effecting the advancing movement of the carriage toward the core: When the carriage has reached a predetermined position, its travel is automatically arrested and it is then returned to starting position by the following mechanism: The shaft 71 of the link 72, as shown in Figs. 3, 5, 6, 8 and 10, is provided with an extension or carriage-controlling element 71ª, and this is adapted to travel between carriage-limiting stops 74 and 75, by which the extent of travel of the carriage is controlled. The stop 74 is adjustably disposed upon a screw-member 76 which extends through a boss 77 formed at the end of a shiftable member 78. The outer end of the screw-member 76 is squared, as at 79, and carries a collar 80 securable to the screw-member 76 by a threaded pin 81. This collar 80 is disposed at one side of the boss 77, while the member 76, at the opposite side of the boss, is provided with an enlargement 82. When the screw-member 76 is turned, as by a wrench or other suitable instrument, the stop 74 will be moved forwardly or backwardly, according to the direction in which the member 76 is turned. In this way, the position of the stop 74 may be changed as may be desired. The stop 75 is similarly disposed upon a screw-member 83 that is supported in an upstanding boss 84 formed on the shiftable member 78 and is held in position by a set-screw 85. The screw-member 83 is formed with an enlargement 86 at one side of the boss 84 and carries a nut 87 at the opposite side thereof. By this means, the position of the stop 75 may be changed. The carriage-controlling element 71ª of the shaft 71 has its path of travel between the stops 74 and 75. When the carriage is in starting position, the element 71ª occupies the position indicated in dotted lines in Figs. 15 and 16, that is, it is then in engagement with the stop 74. The starting position of the carriage may, if the stop 74 is shifted, be changed to the extent of the length of the screw-member 76. As the carriage travels toward the core, the element 71ª will travel with it and eventually impinge against the stop 75 and thereby move the shiftable member 78 longitudinally of the carriage and its support. This member 78 is supported on a flange 88 formed at the top of the upstanding frame 39. Its movement is controlled by the following structure: Extending outwardly from the edge of the shiftable member 78 is a yoke 89, each bifurcation of which carries an adjusting screw 90 and 91, respectively, the ends of which are spaced apart, as shown in Fig. 15. These screws are preferably held in position by lock-nuts 92. Adapted to move back and forth between the spaced-apart ends of the screws 90 and 91 is a clutch-shifter 93 (Figs. 6, 11 and 13) turning on a pivot 94 in a bracket 95 secured on the inside wall of the upper portion of the frame 39. The shifter 93 is provided with a screw-engaging portion 93ª and with a roller-engaging portion 93ᵇ. The portion 93ª engages the screws 90 and 91, while the portion 93ᵇ is adapted to engage a roller 96 (Figs. 11 and 12) carried at the upper end of a clutch-actuating frame or arm 97. This frame fulcrums on a pivot 98 formed in an adjustable bracket 99 that is secured in a pendant portion 100 mounted in a two-sided bracket 101 secured to the inside of the frame 39. The clutch-actuating arm 97 is provided with a yoke 97ª which engages one member 102 of a cone clutch slidably keyed to a shaft 103 supported in bearings 104 and 105 formed in the bracket 101. Loosely mounted on the shaft 103 is the other member 106 of the clutch, a spring 107 being interposed between the clutch members 102 and 106 normally to effect disengagement of the same. Formed as a part of the clutch member 106 is a worm-wheel 108. Keyed to the shaft 103, the same as is the clutch member 102, is a bearing portion 109 of a crank-arm 110, which, by a link 111, is connected to the lever 69.

The worm-wheel 108 is turned by a worm 112 fast on the vertical shaft 59. The latter is constantly rotating, which gives continuous rotation to the worm-wheel 108. When the clutch formed by the members 102 and 106 is engaged, the shaft 103 will be operated and this in turn will actuate the crank 110 and move the link 111 rearwardly to shift the lever 69 and thereby move the pin 68 to the end of the slot 73 opposite to that which it initially occupies, as shown in Fig. 9. During this movement, the rolls 67 will engage and ride on the inclined surfaces 66 of the half-nut 51 and then traverse the lower edges 65 thereof, at the same time lifting the half-nut and disengaging it from the feed-screw 54. By reason of the fact that the lever 69 is secured to the carriage, it will, while swinging in a clockwise direction (Fig. 9) to effect a disengagement of the half-nut 51 from the feed-screw, also move the carriage rearwardly and restore it to starting position.

The foregoing mechanism provides for automatic disengagement of the half-nut from the feed-screw. I have also provided means for manually engaging the nut with the screw, and to this end two hand-levers 113 are secured to opposite ends of the shaft 70, outside of the frame 39, and upstanding to a position that will be convenient to the operator to grasp, as by the handles 114. By this means, the operator may move either of the hand-levers 113 to rotate the shaft 70 on its axis and thereby actuate the lever 69 in a counter-clockwise direction (Fig. 4) to move the rollers 67 toward the left, as viewed in Fig. 9, to disengage them from the surfaces 65, and, then, from the surfaces 66, of the pendant portion 64 of the half-nut 51. The spring 53 then operates to move the half-nut into engagement with the feed-screw and, thus, the carriage is connected to this screw to begin its advancing movement toward the core. If the operator desires, or finds it necessary, to arrest the carriage at any particular point in its forward travel, he operates the hand-levers 113 sufficiently to disengage the half-nut from its feed-screw but not to an extent that will swing the lever 69 far enough to move the carriage rearwardly—unless he also desires to return the carriage to starting position manually, in which event he continues the swinging movement of the lever 113 and thereby moves the lever 69 sufficiently to move the carriage back to starting position.

From the foregoing, it will have been perceived that the carriage, by means of the feed-screw 54, may not only be moved toward the core but it may, by the same means, be returned to normal position. Thus the carriage is given its reciprocatory movement, toward the core and then back to starting position, by the same instrumentalities. After it has reached the predetermined position in its advancing movement, it is automatically arrested in order that it may be restored to normal position. If it be desired not to utilize the power-operated means for returning the carriage to normal position—and in some instances it is desirable not to employ such means—the carriage may be returned to starting position manually, that is, by operating the hand-lever 113.

In lieu of effecting the automatic arresting and return of the carriage to starting position, I may utilize additional means which are included in the machine for doing this. This means includes instrumentalities for manually actuating the shiftable member 78 so as to connect the shaft 103 and the parts operated thereby to the nut-engaging and carriage-returning lever 69. To this end, the member 78 is provided with two spaced-apart lugs 115, between which extends a pin 116 adapted to be engaged by the bifurcated end 117 of a forked lever 118 which is keyed on a shaft 119 journaled in the housing 40 and carrying at opposite ends hand-levers 120. It will be understood that if the operator actuates the lever 120 it will move the shiftable member 78 toward the left, Fig. 6, and thereby cause the adjusting screw 91 to engage the clutch-shifter 93 to clutch the shaft 103 to the worm-wheel 108 and, by this instrumentality (in the manner already explained) effect movement of the nut-positioning and carriage-returning lever 69.

When the carriage is returning to normal position, the element 71ª of the shaft 71 will engage the stop 74 and move the member 78 rearwardly to its initial position. Simultaneously, the adjusting screw 90 will engage with and move the clutch-shifter 93 to effect disengagement of the clutch members 102 and 106, whereupon the carriage-returning mechanism, already described, will be actuated. The distance between the stops 75 and 74 is sufficient to permit the carriage to have a certain amount of return travel without effecting movement of the member 78. Similarly, when the carriage is making its advancing movement, the distance between the stop 74 and the stop 75 is sufficient to permit the carriage to have the required movement in respect to the core, for the stitching operations, before its travel is arrested. By reason of the fact that these stops 74 and 75 are adjustable, as already described, the extent of travel of the carriage in either direction before operating the member 78 may be varied. Thus, the stops 74 and 75 provide for the extreme limits of travel of the carriage. But it is frequently necessary to arrest the travel of the carriage before it reaches its normal limit of travel, and especially during its advancing movement—for instance, when the stitching devices (presently to be described) are operating in respect to certain parts of the core, these operations being determined by the presence or absence of the beads which, during the making of the carcass, are positioned on the fabric-covered core. Such intermediate stopping of the carriage is effected by the manually-operated mechanism already set forth.

By the structure which has now been described, it is shown how the core is operated, first at slow speed for the stretching of the fabric as it is delivered to the core from the fabric-supply unit and, then, at high speed for the subsequent and finishing operations of stitching the fabric down upon the core; also, how travel of the carriage toward the core is initiated; also, how it is then continued to a predetermined point; then how the carriage is arrested either automatically or manually, and then how it is returned to starting position either automatically or manually.

The advancing movement of the carriage is primarily to present to the fabric-covered core certain so-called stitching devices whereby the fabric may be stretched and laid radially about the curved contour of the core. These stitching devices require movement independently of the positioning movement which is given them by the advancing travel of the carriage, and various instrumentalities are employed for effecting such movements, and these are controlled during and by the movement of the carriage. The following is a description thereof:

To begin with, there are two sets of these stitching devices and their operating instrumentalities, arranged at opposite sides of the carriage. In describing one set, therefore, it will be understood that the description will be applicable to the other set except in so far as connecting instrumentalities between the two sets are referred to whereby unison of action thereof is accomplished.

Slidable longitudinally of the carriage is a stitcher-carrying arm 121, which carries at its outer end a stitcher-disk or roll 122 free to rotate on a bearing 123 mounted in the end of the arm 121. Pivotally connected to the arm 121, at its rear end, is a link 124 which is pivoted at 125 to the slide 44. The link 124 carries, intermediate of its ends, a roller 126 adapted to traverse a curved edge 127 of an arm-swinging member 128 which is slidably mounted on the underside of the top-plate 42 of the housing 40. This sliding movement is transverse to the direction of travel of the carriage. The member 128 is provided with a beveled surface 129 and, to effect transverse movement of the member, it is adapted to be engaged, on its beveled edge, by a centrally located sliding block 130, this block being wedge-shaped at its forward end to present beveled edges 131 each of which engages the beveled edge of the member 128. The block 130 is provided at opposite edges with flanges 132 (Fig. 5) by which it is supported for its sliding movement on the top-plate 42 of the housing 40, the plate being provided with an opening of sufficient dimensions to permit longitudinal movement of the block. The block 130 is adapted to be manually operated, and the means for effecting such operation include a toggle-device comprising a link 133 pivoted to the block 130 at 134. Pivotally connected to the link 133 is another link 135 which, is itself, pivoted at 136 to a plate 137 adjustable longitudinally on the top-plate 42 of the housing. Upstanding from the links at the point of pivotal connection between them is a handle 138 by which the operator is enabled to swing the links and thereby break the toggle. Normally, the toggle is in inactive condition, with the links thereof positioned in angular relation. When in that position, the block 130 occupies a position somewhat back of that shown in Figs. 2 and 3. Thus, the arm-swinging members 128 would occupy an unprojected position, that is, one different from that shown in dotted lines, for instance, in Fig. 3. In its unprojected position, the links 124 and arms 121 are disposed in substantial alinement. This is the position which these instrumentalities occupy for the so-called "under-bead operation." For the "over-bead operation", however, the operator grasps the handle 138 and thereby disposes the links 133 and 135 so that the toggle becomes active. In so doing, the block 130 is shifted forwardly and this projects the arm-swinging members 128 outwardly and into the position shown in dotted lines in Figs. 2 and 3. They are then in position to be effective upon the links 124 when the rollers carried thereby engage the curved surface 127 during the forward travel of the carriage. As the roller 126 traverses this curved surface 127, the link 124 is swung on its pivot 125 from the position shown in Fig. 2, and this swings the stitcher-carrying arm 121 into the position shown in Fig. 3. Means are provided to limit the movement of the links 133 and 135 when the toggle is broken, and this includes an abutment element 139 fast on the pivot of the link 135 and adapted to engage an adjustable stop 140 secured to the plate 137. The adjustability of the screw 140 provides for varying the extent of movement of the element 139 and, in consequence, the swinging movement of the toggle-links may thus be varied. In addition, in order to cause the stitcher-rolls 122 to follow certain portions of the contour of the core, the adjusting screw 140 is positioned so as to permit a predetermined projection of the arm-swinging members 127 but not of the magnitude which they have for the over-bead operation.

To produce effective pressure upon the stitcher-rolls 122 while traversing the surface of the fabric-covered core, I provide means for holding the stitcher-carrying arms 121 yieldingly but in such manner that the pressure is varied as the stitchers are moved along the fabric-covered core: To this end, there is pivoted to each arm 121 a connecting-pin 141 which, at its opposite end, is connected to a yoke 142. Interposed between the arm 121 and the yoke 142 is a compression spring 143, one end of which is seated in a swinging element 144 pivoted between the members of the yoke 142. The yoke 142 carries an extension 145 adapted to have a sliding movement in the bifurcated end 146 of a controlling lever 147. The means of connection between the yoke 142 and the bifurcated extension 146 comprises a stud 148 by which the yoke 142 may be adjusted horizontally in its support. Embracing the stud 148 and secured to the extension 146 is a bearing element 149 which has a bifurcated portion 150 to straddle the stud 148. The lever 147 carries a roller 151 which is adapted to travel in a groove 152 that is formed in the underside of a pressure-controlling arm 153 pivoted at 154 to the top-plate 42 of the housing 40.

The two pressure-controlling arms 153 are preferably connected together, and the connection between them comprises two toggles, each connected, as at 155, to the arm 153 and comprising a link 156, and a two-membered lever 157, the latter being connected at 158 to the link 156 and the opposite ends of the levers 157 being connected by a link 159. The levers 157 are, respectively, fulcrumed on pivots 160 and 161 disposed in the top-plate 42 of the housing.

Fast on the pendant end of the pivot 161 is a pinion 162 (Figs. 6 and 7) which is adapted to engage a rack 162ª formed on one edge of the sliding member 78. It will now be understood that, when movement is effected of the member 78, in the manner already described, the pinion 162 is rotated to turn the pivot 161 and thereby swing the toggle attached to it. This in turn effects a unison of movement of the opposite toggle, in consequence of which the two pressure-controlling arms 153 are swung on their pivots inwardly or outwardly, according to the direction of movement of the member 78. The movement of the last-mentioned member is, as already explained, effected automatically during the travel of the carriage, or manually through the hand-levers 120.

During the return movement of the carriage, it is desirable to swing the link 124 and, thereby, the stitcher-carrying arm 121 into alined position, and means are provided for accomplishing this. These means include a link-swinging member 163 secured to the top-plate and provided with a beveled end 164 adapted to be engaged by the roller 126 on the link 124. One portion of the member 163 is cut away, as at 165, to provide clearance for the link 124 during its swinging movement.

*Operation.*—The operation and coöperation of the three units hereinabove described will now be briefly set forth: The operator will draw sufficient of the fabric tire from the fabric supply to effect a positioning of one end on the tire-core 27, which then will be at rest. To draw the fabric from the source of supply and simultaneously to effect a stretching of the same along its medial line as it is, itself, laid down upon the core, the operator then, by means of the clutch-shipper 166 (Fig. 1), actuates the clutch 167 to clutch the shaft 5 (through the slow-speed gear 11) to the shaft 13. Thereby, the core will be set in motion at slow speed and accomplish the aforementioned stretching. Sufficient of the fabric being laid upon the core, the operator then unclutches the shaft 13 from the shaft 5, whereupon the core again comes to rest so that the fabric-ply may be cut to proper length. Then the operator, by means of the clutch-shipper 166, operates a friction-clutch 168 to connect (through the high-speed gear 12) the shaft 13 to the shaft 5 and thereby puts the core in rapid rotation. The first ply on the core is then in condition to be stitched down by the stitching-mechanism, which is set into motion through the hand-lever 113, it being understood that the shafts 10 and 59 are then constantly rotating, as is the feed-screw 54. The movement of the hand-lever 113 operates the nut-positioning lever 69 to engage the half-nut 51 with the feed-screw, whereby the carriage is started on its advancing movement. If its progress is not manually arrested by the operator, the carriage will eventually position the element 71$^a$ into engagement with the stop 83 and thereby effect longitudinal movement of the shiftable member 78, it being understood that before such member is actuated, the element 71$^a$ will have traveled from its position in engagement with the stop 74 (as shown in dotted lines in Figs. 15 and 16) toward and into impinging engagement with the stop 75. During the travel of the carriage, and of the element 71$^a$ between the stops 74 and 75, the stitchers 122 will have been brought into contact with the fabric on the core and have traveled around the curving contour thereof until they reach the point where they finish the stitching of the fabric. As the carriage moves forward toward the core, it carries the stitcher-supporting arms 121 therewith, and moves the roll 126 forwardly into contact with and around the curved surface 127 of the member 128. This swings the pivoted portion of the arm 121 outwardly and in so doing compresses the spring 143 interposed between the arm 121 and the block 146. This action occurs preferably as each stitcher-roll is traveling down the side of the core. By reason of the adjustments provided, as already explained, between the lever 147 and the arm 121, this pressure may be varied at the will of the operator. Just before the stitchers 122 reach the limit of their stitching movement, the element 71$^a$ will have engaged the stop 75 and effected a movement of the member 78. By reason of the consequent meshing of the pinion 162 with the racks 162$^a$ on the member 78, the pivot 161 will be actuated to operate the toggles connected to the pressure-controlling arms 153. These will then be spread apart to separate the stitchers from the core. Simultaneously with the action of these toggles, the clutch-shipper 93 will have passed from engagement with the screw 90 into engagement with the screw 91 to shift the clutch-member 102 into engagement with the clutch-member 106 and thereby connecting the shaft 103 with the worm 108, whereupon the crank 110 is operated to effect a swinging movement of the lever 69. This moves the half-nut out of engagement with the feed-screw 54 to free the carriage therefrom, whereupon continued swinging movement of the lever 69 returns the carriage to starting position. The return movement of the carriage disconnects the element 71$^a$ from the stop 75 and eventually positions it into engagement with the stop 74 to retract the member 78 and restore it to normal position. This restoring movement of the member 78 again operates the clutch-shipper 93 in the opposite direction to unclutch the worm 108 from the shaft 103, whereupon the carriage comes to rest. The restoring movement of the member 78 also turns the pinion 162 in the opposite direction and thereby turns the pivot 161 so as again to operate the toggles in a different direction and thereby swing the pressure-controlling arms 153 inwardly to reposition the stitcher-rolls 122 so as again to be brought into contact with the fabric on the core to stitch down the succeeding ply of fabric.

As the stitcher-rolls 122 move along the surface of the fabric on the core, the latter, by reason of centrifugal force, tends to throw the fabric back beyond the line of stitcher-contact. I have, however, provided means to prevent this: These means include a fabric-guide 169 mounted on the axis 170 of the stitcher. The guide is preferably provided with an outstanding portion having a curved edge 171. This guide tends to position the outstanding portions of the fabric toward the core preliminary to the action thereon of the stitcher-roll. Unless the fabric is thus manipulated by the guide 169, it will have a tendency to turn over on itself and form wrinkles.

The foregoing explanation of the operation is that which usually obtains in the so-called under-bead operation. During this operation, if it be desired to hasten the pressure-action of the stitcher-rolls while traveling along the sides of the core, this may be accomplished by the operator actuating the toggle-device which connects with the block 130 to project the members 128 outwardly more or less and thereby weaken their engagement and action with the roller 126 to force the pivoted ends of the arms 121 outwardly and thereby compress the springs 143. The adjustability of the screw 140 permits this to be accomplished to a predetermined degree and with certainty.

To perform an over-bead operation in the machine, the action of the parts is somewhat different: When the beads have been properly positioned in any suitable manner upon the fabric-covered core and a covering-ply preliminarily laid down thereon, the operator operates the toggle which actuates the members 128 to project them outwardly. Then, as the carriage moves forward and the rollers 126 engage and traverse the curved surface of the members 128, the arms 121 are swung outwardly and thereby position the stitcher-rolls 122 in such manner as to lay the fabric properly around the beads. During this particular action of the stitcher-rolls, and especially as they travel over the beads, the corner 172 (slightly in advance of the contacting point of the stitcher-roll 122) engages the fabric on the bead and thereby smooths and irons it out to prevent wrinkling of the fabric on the bead. The tendency of the fabric to wrinkle at this point, and particularly in making small tires, is great; but the guide 169 has, in practice, been found to prevent such wrinkling.

As the carriage is returning to starting position, the rollers 126 on the links 124 engage the beveled ends of the members 163 and cause them to swing back to a straightened position. Subsequent to this action, preferably, the operator actuates the toggle which shifts the member 130 so that it may be restored to its starting position. This releases the members 128, and they are then returned to their starting position by a spring 173 which is connected to studs 174 upstanding from the members 128. This operation is accomplished when the parts are to be restored to normal position to perform an under-bead operation.

By reason of the elongation of the groove 152 in the pressure-controlling arm 153 and the rather extended travel therein of the roller 151 on the link 147, it is possible for the operator at any stage of the travel of the carriage to operate the hand-levers 120 to clutch the worm 108 to the shaft 103 and thereby arrest the carriage and start it on its return to normal position. In the making of some types of tires, it is sometimes desirable to stop the stitching-rolls 122 in particular relation to the beads, as, for instance, just beyond the heel of the bead. This permits, in that type of tire, the turning back of the innermost ply of fabric so as to be stitched around the bead to secure the bead more firmly in position.

*Modifications.*—In Figs. 30 to 34, I have shown a modified form of pressure-producing structure for the stitching rolls. In this instance, the stitcher-carrying arms 121 are pivotally connected to the position-changing link 124, as in the structure already described, and similarly the pressure-controlling arms 153 are connected by toggle-devices, including the links 156. In this instance, however, means are provided within the groove 152, and in the path therein of the roller 151, to effect an accelerated swinging movement of the lever 147 suddenly to compress the spring 143 and thereby effect an increased pressure of the stitcher-roller at the back of the bead indicated by the reference-character 175. This means includes a block 176 which is provided with a sharpened end 177 adapted to be engaged by the roller 151. The block extends through the inner wall of the groove 152 and its position is controlled by an adjusting screw 178. After being adjusted, it may be locked in position by a bolt 179 extending through an elongated slot 180 in the top of the member 153.

*Finishing operations.*—After the several plies of fabric have been laid successively upon the core, both in the under as well as the over-bead operation, the edges of the plies are trimmed. This is done with a knife or other form of cutter. As a convenient means of supporting the knife during the cutting operation, I have provided a bracket 181 mounted to swing on a pivot 182 upstanding from the housing. To limit the swinging movement of the bracket 181, two oppositely-disposed stops 183 are provided beneath the path of swinging movement of the bracket and are adapted to engage an extension 184 carried by the bracket. This bracket may be employed when the core is swung into its horizontal position on its support, as already explained. It will be understood, however, that I may elect not to employ even the bracket, nor even to trim the fabric while in a horizontal position; or, on the other hand, I may trim the fabric by means of this bracket while the core is in a vertical position and not utilize the coretilting structure at all. In other words, the fabric would then all be laid while the core is in its vertical position and the subsequent trimming and finishing operations performed while in the same position.

I have hereinbefore referred to the fact that the position of the core may, by reason of its being sustained by the rotatable bearing 14, be turned to reverse its position in respect to the stitcher-mechanism unit. Because of the fact that the bearing-bracket 22 is offset with relation to the axis of the bearing 14, the core 27 will, when its position is thus reversed, occupy the same relative vertical position with respect to the stitcher-mechanism unit as originally; but it will, in the reversed position, be rotated in the opposite direction without changing the direction of motion of its drive. One purpose of thus reversing the position and direction of rotation of the core is to change the relative traversing action of the stitcher-disks 122 in respect to the lay of the warp-threads of the tire-fabric being operated on and thereby effect a stretching and rolling down of this fabric in a direction reverse to that in which the underlying ply was stretched and rolled. In practice, it sometimes occurs that if the stitcher-disks are permitted to operate upon a ply of fabric so that their movement is relatively crosswise of the direction of stretch of the fabric, there is a tendency to produce a wrinkling or waving of the fabric, due to the fact that the natural lay of its threads is somewhat distorted; whereas, if the traverse of the stitcher-rolls is in the direct line of stretch of the fabric, this will not occur. If the threads are thus distorted or stressed, it tends to weaken the carcass, and this may result in the tire subsequently rupturing at that point because the distorted threads do not at first perform their function of taking their part of the pressure when the tire is inflated but impose upon other contiguous threads an unusual strain.

When the position of the core is reversed, as already described, its direction of rotation with respect to the stitchers is correspondingly reversed, by reason of which fact the direction of pressure on the stitcher-rolls and their supports is upward, rather than downward, as before. To maintain the stitcher-supports against any upward movement, I provide a top-guide 185 (Figs. 3, 30 and 34), this being secured to the slide 144 and having a sliding fit with respect to the stitcher-carrying arm 121.

While the machine herein disclosed is primarily adapted for producing tire-carcasses made of tire-fabric; nevertheless it is to be understood that it is possible to build thereon tire-carcasses for cord-tires from cord-material; and in this connection the reversible core-unit, just described, is particularly efficient. In this instance, it is preferable to employ but one stitcher, operating on one side of the core, the reversing of this core enabling that stitcher to function also on the opposite side of the core, the traversing movement of the stitcher being in both instances always in the direction of the lay of the cords so that no crosswise traversing movement of the stitchers on the cords shall occur.

From the foregoing description, it will be perceived that I have devised a carcass-building machine of a simple and compact type, and one which is highly efficient. It is to be understood, however, that the machine, as herein disclosed, is merely an exemplification of the principles of my invention and that it is susceptible of a wide range of variation without departing from the spirit thereof.

What I claim is:

1. A tire-building machine including a supporting structure, a carriage having a reciprocatory movement thereon, stitcher supporting members carried thereby, means for moving the carriage in one direction, means arranged in the path of travel of the carriage for effecting its release from said carriage-moving means, and means automatically operated for effecting a return of the carriage and of the carriage moving means to normal position.

2. A tire-building machine including a supporting structure, a carriage having a reciprocatory travel thereon, power-operated means for effecting an advancing movement of the carriage in one direction, means arranged in the path of travel of the carriage for releasing it from said carriage-moving means, power-operated mechanism operatively connected to but actuatable independently of the carriage-advancing means and thrown into operation by said releasing means for returning the carriage and the carriage advancing means to starting position, and manually-operated means for stopping said carriage at the will of the operator.

3. A tire-building machine including a supporting structure, a carriage having a reciprocatory movement thereon, means for moving the carriage in one direction, power-operated mechanism for actuating said carriage-moving means, means arranged in the path of travel of the carriage for automatically releasing it from the carriage-moving means, and means including a carriage-returning lever operating on a fulcrum disposed below the plane of the path of travel of the carriage and also operated by the power-operated means for moving the carriage back to starting position and simultaneously restoring the carriage moving-means to normal condition.

4. A tire-building machine including a supporting structure, a carriage having a reciprocatory movement thereon, means for moving the carriage in one direction, power-operated mechanism for actuating said carriage-moving means, means arranged in the path of travel of the carriage for automatically releasing it from the carriage-moving means, means including a carriage-returning lever operating on a fulcrum disposed below the plane of the path of travel of the carriage and also operated by the power-operated means for moving the carriage and the carriage moving means back to starting position, and manually-operated means connected to said releasing means for stopping the carriage at the will of the operator.

5. A tire-building machine including a supporting structure, a carriage having a reciprocatory movement thereon, driving mechanism sustained by said supporting structure for effecting both an advancing and a returning movement of the carriage and including a vertical shaft, a worm carried thereby, a worm-wheel in engagement with the worm, a shaft on which the worm-wheel is mounted, a clutch encompassing the shaft, means for operating said clutch including a clutch-operating lever, a clutch-actuating member engageable with said clutch-operating lever, a shiftable member juxtaposed to the carriage, means carried by the slide and engageable with said clutch-actuating member, means carried by the carriage and normally unconnected to the shiftable member and engageable therewith for actuating it in two directions, said shiftable member carrying a plurality of spaced-apart stops alternately engageable by said carriage-carried means, and manually-operated means for varying the position of said stops, said shiftable member carrying a rack, a pinion meshing therewith, stitcher-carrying arms mounted on the carriage, stitcher devices carried by the arms, and means operated by said pinion for actuating said stitcher-carrying arms.

6. A tire-building machine including a supporting structure, a carriage having a reciprocatory movement thereon, stitcher arms carried by and movable with the carriage, stitcher devices on and positionable by the arms, and mechanism for controlling the action of said stitcher arms comprising pressure-producing members connected to said supporting structure, resilient means connected to the stitcher arms, means connected to the carriage and movable in relation to said pressure-producing members, a shiftable member juxtaposed to the carriage, means carried by the carriage and engageable with said shiftable member for actuating it in the direction of travel of the carriage, a rack formed on the shiftable member, a pinion in engagement with the rack, and means connecting said pressure-producing members and actuated by said pinion for moving said pressure-producing members relatively.

7. A tire-building machine including a supporting structure, a carriage having a reciprocatory movement thereon, stitcher arms carried by and movable with the carriage, stitching devices on and positionable by the arms, and mechanism for controlling the action of said stitcher arms comprising pressure-producing members connected to said supporting structure, resilient means connected to the stitcher arms, means connected to the carriage and movable in relation to said pressure-producing members, a shiftable member juxtaposed to the carriage, means carried by the carriage and engageable with said shiftable member for actuating it in the direction of travel of the carriage, a rack formed on the shiftable member, a pinion in engagement with the rack, and means connecting said pressure-producing members and actuated by said pinion for moving said pressure-producing members relatively, including a plurality of toggle-devices interposed between the members and connected to said pinion.

8. A tire-building machine including a supporting structure, a carriage having a reciprocatory movement thereon, stitcher arms carried by and movable with the carriage, stitcher devices on and positionable by the arms, and mechanism for controlling the action of said stitcher arms comprising pressure-producing members connected to said supporting structure, resilient means connected to the stitcher arms, means connected to the carriage and movable in relation to said pressure-producing members, a shiftable member juxtaposed to the carriage, means carried by the carriage and engageable with said shiftable member for actuating it in the direction of travel of the carriage, a rack formed on the shiftable member, a pinion in engagement with the rack, and means connecting said pressure-producing members and actuated by said pinion for moving said pressure-producing members relatively, including a plurality of toggle-devices interposed between the members and connected to said pinion, said pressure-producing members being formed with elongated grooves, links underlying the pressure-producing members and carrying rollers adapted to travel in said grooves, and connecting devices interposed between said roller-carrying links and the stitcher-carrying arms whereby, when said toggle-devices are operated by the pinion, said pressure-producing arms are shifted to effect a change of pressure upon said stitcher-carrying arms.

9. A tire-building machine including a supporting structure, a carriage having a reciprocatory movement thereon, stitcher arms carried by and movable with the carriage, stitcher devices on and positionable by the arms, and mechanism for controlling the action of said stitcher arms comprising pressure-producing members connected to said supporting structure, resilient means connected to the stitcher arms, means connected to the carriage and movable in relation to said pressure-producing members, a shiftable member juxtaposed to the carriage, means carried by the carriage and engageable with said shiftable member for actuating it in the direction of travel of the carriage, a rack formed on the shiftable member, a pinion in engagement with the rack, and means connecting said pressure-producing members and actuated by said pinion for moving said pressure-producing members relatively, including a plurality of toggle devices interposed between the members and connected to said pinion, said pressure-producing members being formed with elongated grooves, links underlying the pressure-producing members and carrying rollers adapted to travel in said grooves, connecting devices interposed between said roller-carrying links and the stitcher-carrying arms whereby, when said toggle-devices are operated by the pinion, said pressure-producing arms are shifted to effect a change of pressure upon said stitcher-carrying arms, links pivoted to the carriage and to said stitcher-carrying arms, rollers carried by the links, and means projectable into the path of travel of the rollers on said links and engageable thereby for shifting the links and swinging the stitcher-carrying arms during the travel of the carriage.

10. A tire-building machine including a supporting structure, a carriage having a reciprocatory movement thereon, stitcher arms carried by and movable with the carriage, stitcher devices on and positionable by the arms, and mechanism for controlling the action of said stitcher arms comprising pressure-producing members connected to said supporting structure, resilient means connected to the stitcher arms, means connected to the carriage and movable in relation to said pressure-producing members, a shiftable member juxtaposed to the carriage, means carried by the carriage and engageable with said shiftable member for actuating it in the direction of travel of the carriage, a rack formed on the shiftable member, a pinion in engagement with the rack, and means connecting said pressure-producing members and actuated by said pinion for moving said pressure-producing member relatively, including a plurality of toggle-devices interposed between the members and connected to said pinion, said pressure-producing members being formed with elongated grooves, links underlying said pressure-producing members and carrying rollers adapted to travel in said grooves, connecting devices interposed between said roller-carrying links and the stitcher-carrying arms whereby, when said toggle-devices are operated by the pinion, said pressure-producing arms are shifted to effect a change of pressure upon said stitcher carrying arms, links pivoted to the carriage and to said stitcher-carrying arms, rollers carried by the links, means projectable into the path of travel of the rollers on said links and engageable thereby for shifting the links and swinging the stitcher-carrying arms during the travel of the carriage, said roller-engaging means including a transversely movable element having a curved edge adapted to be traversed by said roller, a toggle-device operable to shift said transversely movable element, an element-engaging member shiftable in the direction of travel of the carriage and adapted to move said transversely shiftable element, and a connection between said element-engaging member and the toggle-device.

11. A tire-building machine including a supporting structure, a carriage having a reciprocatory movement thereon, stitcher arms carried by and movable with the carriage, stitcher devices on and positionable by the arms, and mechanism for controlling the action of said stitcher arms comprising pressure-producing members connected to said supporting structure, resilient means connected to the carriage and movable in relation to said pressure-producing members, a shiftable member juxtaposed to the carriage, means carried by the carriage and engageable with said shiftable member for actuating it in the direction of travel of the carriage, a rack formed on the shiftable member, a pinion in engagement with the rack, and means connecting said pressure-producing members and actuated by said pinion for moving said pressure-producing members relatively, including a plurality of toggle-devices interposed between the members and connected to said pinion, said pressure-producing members being formed with elongated grooves, links underlying the pressure-producing members and carrying rollers adapted to travel in said grooves, connecting devices interposed between said roller-carrying links and the stitcher-carrying arms whereby, when said toggle-devices are operated by the pinion, said pressure-producing arms are shifted to effect a change of pressure upon said stitcher-carrying arms, links pivoted to the carriage and to said stitcher-carrying arms, rollers carried by the links, means projectable into the path of travel of the rollers on said links and engageable thereby for shifting the links and swinging the stitcher-carrying arms during the travel of the carriage, said roller-engaging means including a transversely movable element having a curved edge adapted to be traversed by said roller, a toggle-device operable to shift said transversely movable element, an element-engaging member shiftable in the direction of travel of the carriage and adapted to move said transversely shiftable element, a connection between said element-engaging member and the toggle-device, and means for manually operating said toggle-device.

12. A tire-building machine including a supporting structure, a carriage having a reciprocatory movement thereon, stitcher arms carried by and movable with the carriage, stitcher devices on and positionable by the arms, and mechanism for controlling the action of said stitcher arms comprising pressure-producing members connected to said supporting structure, resilient means connected to the stitcher arms, means connected to the carriage and movable in relation to said pressure-producing members, a shiftable member juxtaposed to the carriage, means carried by the carriage and engageable with said shiftable member for actuating it in the direction of travel of the carriage, a rack formed on the shiftable member, a pinion in engagement with the rack, and means connecting said pressure-producing members and actuated by said pinion for moving said pressure-producing members relatively, including a plurality of toggle-devices interposed between the members and connected to said pinion, said pressure-producing members being formed with elongated grooves, links underlying the pressure-producing members and carrying rollers adapted to travel in said grooves, connecting devices interposed between said roller-carrying links and the stitcher-carrying arms whereby, when said toggle-devices are operated by the pinion, said pressure-producing arms are shifted to effect a change of pressure upon said stitcher-carrying arms, links pivoted to the carriage and to said stitcher-carrying arms, rollers carried by the links, means projectable into the path of travel of the rollers on said links and engageable thereby for shifting the links and swinging the stitcher-carrying arms during the travel of the carriage, said roller-engaging means including a transversely movable element having a curved edge adapted to be traversed by said roller, a toggle-device operable to shift said transversely movable element, an element-engaging member shiftable in the direction of travel of the carriage and adapted to move said transversely shiftable element, a connection between said element-engaging member and the toggle-device, means for manually operating said toggle-device.

13. A tire-building machine including a supporting structure, a carriage having a reciprocatory movement thereon, stitcher arms carried by and movable with the carriage, stitcher devices on and positionable by the arms, and mechanism for controlling the action of said stitcher arms comprising pressure-producing members connected to said supporting structure, resilient means connected to the stitcher arms, means connected to the carriage and movable in relation to said pressure-producing members, a shiftable member juxtaposed to the carriage, means carried by the carriage and engageable with said shiftable member for actuating it in the direction of travel of the carriage, a rack formed on the shiftable member, a pinion in engagement with the rack, and means connecting said pressure-producing members and actuated by said pinion for moving said pressure-producing members relatively, including a plurality of toggle-devices interposed between the members and connected to said pinion, said pressure-producing members being formed with elongated grooves, links underlying the pressure-producing members and carrying rollers adapted to travel in said grooves, connecting devices interposed between said roller-carrying links and the stitcher-carrying arms whereby, when said toggle-devices are operated by the pinion, said pressure-producing arms are shifted to effect a change of pressure upon said stitcher-carrying arms, links pivoted to the carriage and to said stitcher-carrying arms, rollers carried by the links, means projectable into the path of travel of the rollers on said links and engageable thereby for shifting the links and swinging the stitcher-carrying arms during the travel of the carriage, said roller-engaging means including a transversely movable element having a curved edge adapted to be traversed by said roller, a toggle-device operable to shift said transversely movable element, an element-engaging member shiftable in the direction of travel of the carriage and adapted to move said transversely shiftable element, a connection between said element-engaging member and the toggle-device, means for manually operating said toggle-device, and a limit-stop for controlling the extent of movement of the toggle-device, said limit-stop being adjustable to vary the position of the stop and thus to change the extent of movement of the toggle-device.

14. A tire-building machine including a supporting structure, a carriage having a reciprocatory movement thereon, stitcher-carrying arms on the carriage, stitcher devices on the arms, and mechanism for controlling the action of the arms and stitcher devices comprising pressure - producing members juxtaposed to the stitcher-carrying arms and formed with grooves, means for varying the relation between the pressure - producing members, compression springs connected to the stitcher-carrying arms, means connected to the compression springs for tensioning them including levers attached to the springs, links connected to the levers, and rollers carried by the links and traveling in said grooves.

15. A tire-building machine including a supporting structure, a carriage having a reciprocatory movement thereon, stitcher-carrying arms on the carriage, stitcher devices on the arms, and mechanism for controlling the action of the arms and stitcher devices comprising pressure - producing members juxtaposed to the stitcher-carrying arms and formed with grooves, means for varying the relation between the pressure-producing members, compression springs connected to the stitcher-carrying arms, means connected to the compression springs for tensioning them including levers attached to the springs, links connected to the levers, and rollers carried by the links and traveling in said grooves, arm-swinging means including links connected to the stitcher-carrying arms, rollers carried by the links, shiftable elements movable in relation to the links and engageable by said rollers, a shifting device engageable with said shiftable elements for moving them in relation to the roller-carrying links, a toggle-device connected to said shiftable member, and manually-operated means for actuating said toggle-device.

16. A tire-building machine including a supporting structure, a carriage having a reciprocatory movement thereon, stitcher-carrying arms on the carriage, stitcher devices on the arms, and mechanism for controlling the action of the arms and stitcher devices comprising pressure - producing members juxtaposed to the stitcher-carrying arms and formed with grooves, means for varying the relation between the pressure-producing members, compression springs connected to the stitcher-carrying arms, means connected to the compression springs for tensioning them including levers attached to the springs, links connected to the levers, rollers carried by the links and traveling in said grooves, arm-swinging means including links connected to the stitcher-carrying arms, rollers carried by the links, shiftable elements movable in relation to the links and engageable by said rollers, a shifting device engageable with said shiftable elements for moving them in relation to the roller-carrying links, a toggle-device connected to said shiftable member, manually-operated means for actuating said toggle-device, and means stationary on the supporting structure and engageable by said roller-carrying links to move the links and thereby bring the links and the stitcher-carrying arms into substantial alinement.

17. A tire-building machine including a supporting structure, a carriage having a reciprocatory movement thereon, stitcher-carrying arms on the carriage, stitcher devices on the arms, and mechanism for controlling the action of the arms and stitcher devices comprising pressure - producing members juxtaposed to the stitcher-carrying arms and formed with grooves, means for varying the relation between the pressure-producing members, compression springs connected to the stitcher-carrying arms, means connected to the compression springs for tensioning them including levers attached to the springs, links connected to the levers, rollers carried by the links and traveling in said grooves, arm-swinging means including links connected to the stitcher-carrying arms, rollers carried by the links, shiftable elements movable in relation to the links and engageable by said rollers, a shifting device engageable with said shiftable elements for moving them in relation to the roller-carrying links, a toggle-device connected to said shiftable member, manually-operated means for actuating said toggle-device, and means stationary on the supporting structure and engageable by said roller-carrying links to move the links and thereby bring the links and the stitcher-carrying arms into substantial alinement, including a stationary abutment having a beveled end adapted to be engaged by the roller on the link.

18. A tire-building machine including a supporting structure, a vertically-disposed driving spindle journaled therein, a feed-screw connected to and adapted to be driven by said spindle, means for manually operating said feed-screw, a vertically reciprocable half-nut device normally disengaged from the feed-screw, a carriage adapted to be reciprocated on the supporting structure and normally disconnected from the feed-screw, means for actuating said half-nut device including a pivoted link, a pin carried thereby, a roller carried by the pin and engageable with said half-nut, a nut-positioning and carriage-releasing lever, a pin-and-slot connection between the lever and the link, and a compression spring acting on said half-nut.

19. A tire-building machine including a supporting structure, a vertically-disposed driving spindle journaled therein, a feed-screw connected to and adapted to be driven by said spindle, means for manually operating said feed-screw independently of the spindle, a half-nut device normally disengaged from the feed-screw, a carriage adapted to be reciprocated on the supporting structure and normally disconnected from the feed-screw, means for actuating said half-nut device including a pivoted link, a pin carried thereby, a roller carried by the pin and engageable with said half-nut, a nut-positioning and carriage-releasing lever, a pin-and-slot connection between the lever and the link, a compression spring acting on said half-nut, and manually-operated levers connected to said nut-positioning lever for actuating the same and at the will of the operator to disconnect the half-nut from the feed-screw.

20. A tire-building machine including a supporting structure, a vertically-disposed driving spindle journaled therein, a feed-screw connected to and adapted to be driven by said spindle, means for manually operating said feed-screw, a half-nut device normally disengaged from the feed-screw, a carriage adapted to be reciprocated on the supporting structure and normally disconnected from the feed-screw, means for actuating said half-nut device including a pivoted link, a pin carried thereby, a roller carried by the pin and engageable with said half-nut, a nut-positioning and carriage-releasing lever, a pin-and-slot connection between the lever and the link, a compression spring acting on said half-nut, manually-operated levers connected to said nut-positioning lever for actuating the same and at the will of the operator to disconnect the half-nut from the feed-screw, and means for actuating said nut-positioning lever including a link pivotally connected thereto, a crank connected to the link, a shaft on which the crank is keyed, a worm-wheel encompassing the shaft, a worm engaging the worm-wheel, a spindle on which the worm is formed, and means for driving the spindle.

21. A tire-building machine including a supporting structure, a vertically-disposed driving spindle journaled therein, a feed-screw connected to and adapted to be driven by said spindle, means for manually operating said feed-screw, a half-nut device normally disengaged from the feed-screw, a carriage adapted to be reciprocated on the supporting structure and normally disconnected from the feed-screw, means for actuating said half-nut device including a pivoted link, a pin carried thereby, a roller carried by the pin and engageable with said half-nut, a nut-positioning and carriage-releasing lever, a pin-and-slot connection between the lever and the link, a compression spring acting on said half-nut, manually-operated levers connected to said nut-positioning lever for actuating the same and at the will of the operator to disconnect the half-nut from the feed-screw, means for actuating said nut-positioning lever including a link pivotally connected thereto, a crank connected to the link, a shaft on which the crank is keyed, a worm-wheel encompassing the shaft, a worm engaging the worm-wheel, a spindle on which the worm is formed, means for driving the spindle, and means for operating the clutch including a spanner connected to the clutch, a clutch-shifting member engageable with the spanner, and a shiftable plate juxtaposed to the carriage and actuatable thereby.

22. A tire-building machine including a supporting structure, a vertically-disposed driving spindle journaled therein, a feed-screw connected to and adapted to be driven by said spindle, means for manually operating said feed-screw, a half-nut device normally disengaged from the feed-screw, a carriage adapted to be reciprocated on the supporting structure and normally disconnected from the feed-screw, means for actuating said half-nut device including a pivoted link, a pin carried thereby, a roller carried by the pin and engageable with said half-nut, a nut-positioning and carriage-releasing lever, a pin-and-slot connection between the lever and the link, a compression spring acting on said half-nut, manually-operated levers connected to said nut-positioning lever for actuating the same and at the will of the operator to disconnect the half-nut from the feed-screw, means for actuating said nut-positioning lever including a link pivotally connected thereto, a crank connected to the link, a shaft on which the crank is keyed, a worm-wheel encompassing the shaft, a worm engaging the worm-wheel, a spindle on which the worm is formed, means for driving the spindle, and means for operating the clutch including a spanner connected to the clutch, a clutch-shifting member engageable with the spanner, and a shiftable plate juxtaposed to the carriage and actuatable thereby, said shiftable member including stops, and a device carried by the carriage and engageable with the stops alternately to shift it in two directions, said spanner-engaging member being actuatable by the shiftable member according to the direction of travel of the carriage.

23. A tire-building machine including a supporting structure, a carriage having a reciprocatory movement thereon, carriage-moving means sustained by the supporting structure and connectible to the carriage for automatically effecting both an advancing and a receding movement of the carriage, driving mechanism connected to the carriage-moving means, a core in relation to which the carriage is moved, means for actuating the core, and a connection between the core-actuating means and the driving mechanism for the carriage-moving means, whereby the carriage and core may be actuated in synchronism.

24. A tire-building machine including a supporting structure, a carriage having a reciprocatory movement thereon, stitcher-supporting members carried thereby, a feed-screw for moving the carriage in one direction, and carriage-returning mechanism including a driving member associated with the feed-screw, a shaft operatively associated with the driving member, a shiftable member operable by the movement of the carriage, means for connecting the carriage to said shaft, a nut-positioning and carriage-returning lever operatively associated with the shaft, and means operated by the shaft and connected to the lever for moving the same in one direction.

25. A tire building machine including a reciprocable stitcher-sustaining carriage, a support therefor, and means sustained by the support for moving the carriage in two directions and comprising two components, one connectible to the carriage at the will of the operator for moving it in one direction, and the other connected to the first component and including a vertically-disposed swinging carriage-returning lever and automatically actuatable to restore the same to normal condition and to move the carriage in the opposite direction.

26. A tire building machine including a reciprocable stitcher-sustaining carriage, a support therefor, and a single means for moving the carriage in two directions and comprising two connected components, one normally disconnected from the carriage but connectible thereto at the will of the operator, and the other connected to the carriage and including a vertically-disposed swinging carriage-returning lever and automatically actuatable to move the carriage in the opposite direction and to restore the first component to normal condition.

27. A tire building machine including a reciprocable stitcher-sustaining carriage, means for effecting a movement of the carriage in two directions comprising two associated components, one normally disconnected from the carriage but connectible thereto at the will of the operator, and the other component including a vertically-disposed, swinging carriage-returning element connected to the carriage and automatically actuatable to return the carriage to starting position and simultaneously restore the first component to normal condition, and a drive common to both components for actuating the same.

28. A tire building machine including a reciprocable stitcher-sustaining carriage, means for effecting a movement of the carriage in two directions comprising two associated components, one normally disconnected from the carriage but connectible thereto at the will of the operator, and the other component including a vertically-disposed swinging carriage-returning element connected to the carriage and automatically actuatable to return the carriage to starting position and simultaneously restore the first component to normal condition, a drive common to both components for actuating the same, a core associated with the carriage, and a core-drive connected to the core, the core being movable to reverse its position with respect to its drive.

29. A tire building machine including a reciprocable stitcher-sustaining carriage, means for effecting a movement of the carriage in two directions comprising two associated components, one normally disconnected from the carriage but connectible thereto at the will of the operator, and the other component including a vertically-disposed, swinging carriage-returning element connected to the carriage and automatically actuatable to return the carriage to starting position and simultaneously restore the first component to normal condition, said element being swung in one direction by an advancing movement of the carriage and then becoming active to effect its carriage-returning function, a drive common to both components for actuating the same, in combination with a core-support, a core sustained thereby, and a core drive, the core-support being movable to reverse the position of the core with respect to its drive.

30. A tire building machine including a reciprocable stitcher-sustaining carriage, means for effecting a movement of the carriage in two directions comprising two associated components, one normally disconnected from the carriage but connectible thereto at the will of the operator, and the other component including a vertically-disposed, swinging carriage-returning element connected to the carriage and automatically actuatable to return the carriage to starting position and simultaneously restore the first component to normal condition, said element being swung in one direction by an advancing movement of the carriage and then becoming active to effect its carriage-returning function, a drive common to both components for actuating the same, in combination with a support, a core-chuck sustained thereby, a core-drive for actuating the chuck, and means for reversing the position of the core-chuck with respect to the drive.

31. A tire building machine including a reciprocable stitcher-sustaining carriage, means for effecting a movement of the carriage in two directions comprising two associated components, one normally disconnected from the carriage but connectible thereto at the will of the operator, and the other component including a vertically-disposed, swinging carriage-returning element connected to the carriage and automatically actuatable to return the carriage to starting position and simultaneously restore the first component to normal condition, said element being swung in one direction by an advancing movement of the carriage and then becoming active to effect its carriage-returning function, a drive common to both components for actuating the same, in associated combination with a support, a core unit sustained thereby and including gearing, a shaft deriving motion from said gearing, a bearing bracket sustained by the shaft, and a chuck operatively connected to the shaft, the bearing bracket being rotatable in respect to the gearing.

32. A tire building machine including a reciprocable stitcher-sustaining carriage, and means for moving the same in two directions comprising two connected components, one component comprising a feed-screw, a screw-engaging nut normally unconnected with the screw, means actuatable by the operator for engaging the nut with the screw, and a drive for the screw; the second component including carriage-returning mechanism comprising a swinging, vertically-disposed element connected to the carriage and to the first component whereby the carriage may be returned to starting position while the first component is being restored to normal condition.

In testimony whereof I affix my signature in presence of two witnesses.

JOHN J. CONVERY.

Witnesses:
EDMUND H. PARRY,
M. E. SMOOT.